May 20, 1969 HIROTOSHI SHIRASU ET AL 3,445,605

COMMON CONTROL AUTOMATIC EXCHANGE INCLUDING MEANS FOR RECEIVING, STORING AND REGENERATING A SELECTING SIGNAL

Filed Aug. 27, 1965 Sheet 1 of 4

INVENTORS
Hirotoshi Shirasu
Tadahiko Akiyama
Yasumichi Arai

BY Paul M. Craig, Jr.
ATTORNEY

INVENTORS
Hirotoshi Shirasu
Tadahiko Akiyama
Yasumichi Arai
BY Paul M. Craig, Jr.
ATTORNEY INVENTORS
Hirotoshi Shirasu
Tadahiko Akiyama
Yasumichi Arai BY Paul M. Craig, Jr.
ATTORNEY COMMON CONTROL AUTOMATIC EXCHANGE INCLUDING MEANS FOR RECEIVING, STORING AND REGENERATING A SELECTING SIGNAL Filed Aug. 27, 1965

INVENTORS
Hirotoshi Shirasu
Tadahiko Akiyama
Yasumichi Arai

BY Paul M. Craig, Jr.
ATTORNEY

United States Patent Office 3,445,605

Patented May 20, 1969

3,445,605

COMMON CONTROL AUTOMATIC EXCHANGE INCLUDING MEANS FOR RECEIVING, STORING AND REGENERATING A SELECTING SIGNAL

Hirotoshi Shirasu, Tadahiko Akiyama, and Yasumichi Arai, Yokohama, Japan, assignors to Hitachi, Ltd., Tokyo, Japan Filed Aug. 27, 1965, Ser. No. 483,143
Claims priority, application Japan, Aug. 28, 1964, 39/48,410
Int. Cl. H04m *3/56*
U.S. Cl. 179—18 4 Claims

ABSTRACT OF THE DISCLOSURE

A common control automatic exchange including a register and a register sender wherein detection of a request for an outgoing trunk from subscriber signals in the register connected to the subscriber line along a first channel result in the establishment of a second channel between the subscriber and the register sender through an outgoing trunk whereby the remaining subscriber selecting signals may be received in the register sender for further outpulsing, the register including means operable in combination with a marker for transferring the signals stored therein to the register sender only during the interval between signals.

This invention relates to automatic exchanges and more particularly to those of the common-control type which includes a register for receiving and storing selecting signals coming from calling subscribers or preceding offices and a sender for reproducing or transforming and sending out the selecting signal stored in the register.

Common-control type automatic exchanges have previously been known in various forms including respective arrangements of the register and sender. The previous methods, however, have all been unsatisfactory in that some of them having a good serviceability are less economical and the others excelling in economics are poor in serviceability.

The present invention has for its object to provide a novel common-control type automatic exchange which excels in both serviceability and economics.

Another object of the present invention is to provide a common-control type automatic exchange which is adaptable to the cyclic mode of registering or sending operation, in which the storing circuit of the register is cyclically utilized in cooperation with the sender.

These and other objects, features and advantages of the present invention will become apparent from the following description when taken in conjunction with the accompanying drawings, in which.

Figure 1:
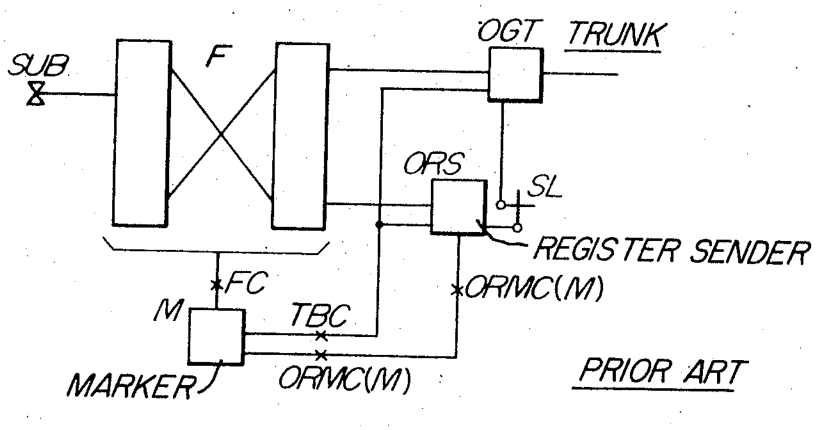
FIGS. 1 to 3 are trunking diagrams of the respective conventional forms of common-control automatic exchange illustrating the outgoing trunk connection employing a sender.

Referring to the drawings, FIG. 1 illustrates one conventional common-control type automatic exchange including a so-called register-sender ORS which has a function as a register and that as a sender. In this form, even when the register part of the register-sender ORS is receiving a selecting signal, the register-sender ORS is connectible, upon reception of an information as required to identify the subsequent station, with the outgoing trunk OGT through the intermediary of the sender link SL under control of the marker M, enabling the sender part to immediately reproduce and send out the selecting signal. Accordingly, with this form of automatic exchange, the length of time between completion of the dialling operation on the calling telephone and its actual connection with the called telephone can be substantially reduced enhancing the serviceability of the exchange. In general cases, however, where the number of calls utilizing the sender is limited relative to the entire number of calls handled, it is economically undesirable that all the registers employed be designed also to function as a sender.

Figure 2:
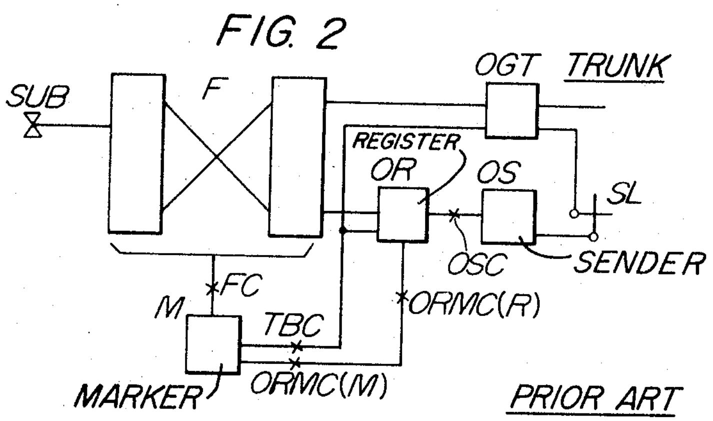

Another conventional form of common-control automatic exchange is shown in FIG. 2 and in this form an idle sender OS is selected as required from the register OR and connected therewith through the sender connector OSC. Such outgoing trunk connection can give a satisfactory exchange service as with the case of the trunking system shown in FIG. 1. Moreover, in FIG. 2 the sender OS can be installed in accordance with the volume of calls. This forms an economical advantage over the system of FIG. 1 but the fact that the sender connector OSC increases in size as the numbers of registers OR and senders OS are increased forms an economical demerit of this form of automatic exchange.

Figure 3:
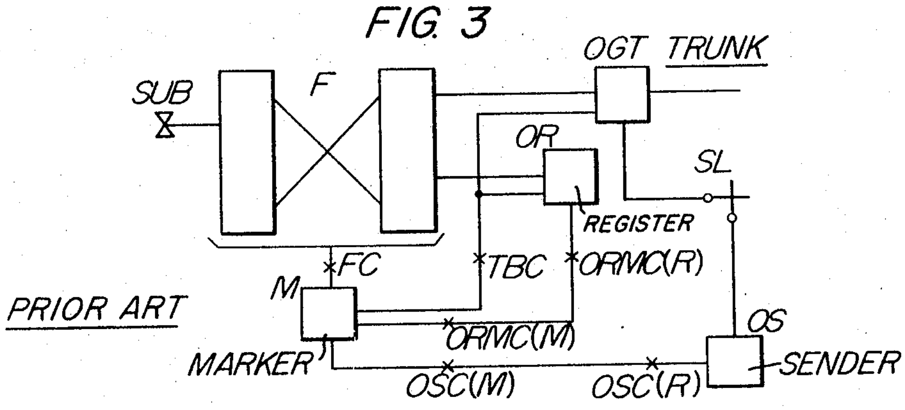

In a further conventional trunking system shown in FIG. 3, the marker M is started after the register OR has received all the digits of a selecting signal to size the sender OS and thus all the related information from the register OR is transferred through the marker M to the sender OS. This trunking system is most economical since the sender OS can be installed in accordance with the volume of calls and since the connectors can be limited in size due to the fact that the information from the register OR is instantaneously transferred to the sender OS through the marker M. This trunk connection, however, is effected only after the register OR has received all the digits of a selecting signal, as described above, to cause the sender OS to reproduce and send out the selecting signal. This necessarily increases the length of time between completion of the dialling operation on the calling telephone and its complete connection with the called telephone, resulting in a reduced exchange service to subscribers.

It is well known that both the register and sender can be reduced in size by cyclically utilizing the storing circuit of the register in cooperation with the sender. Such cyclic mode of registering and sending operation can be employed with the systems of FIGS. 1 and 2 but cannot be applied to the system of FIG. 3.

The present invention will next be described in detail with reference to FIGS. 4, *5a* and *5b*.

Figure 4:
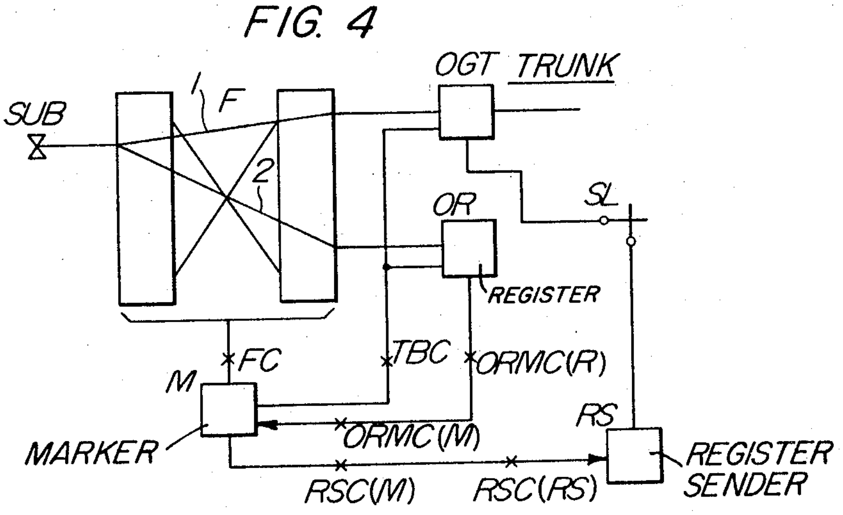
FIG. 4 is a trunking diagram of the automatic exchange according to the present invention; and FIGS. *5a* and *5b* jointly represent a circuit diagram of one embodiment of the present invention.
Figure 5A:
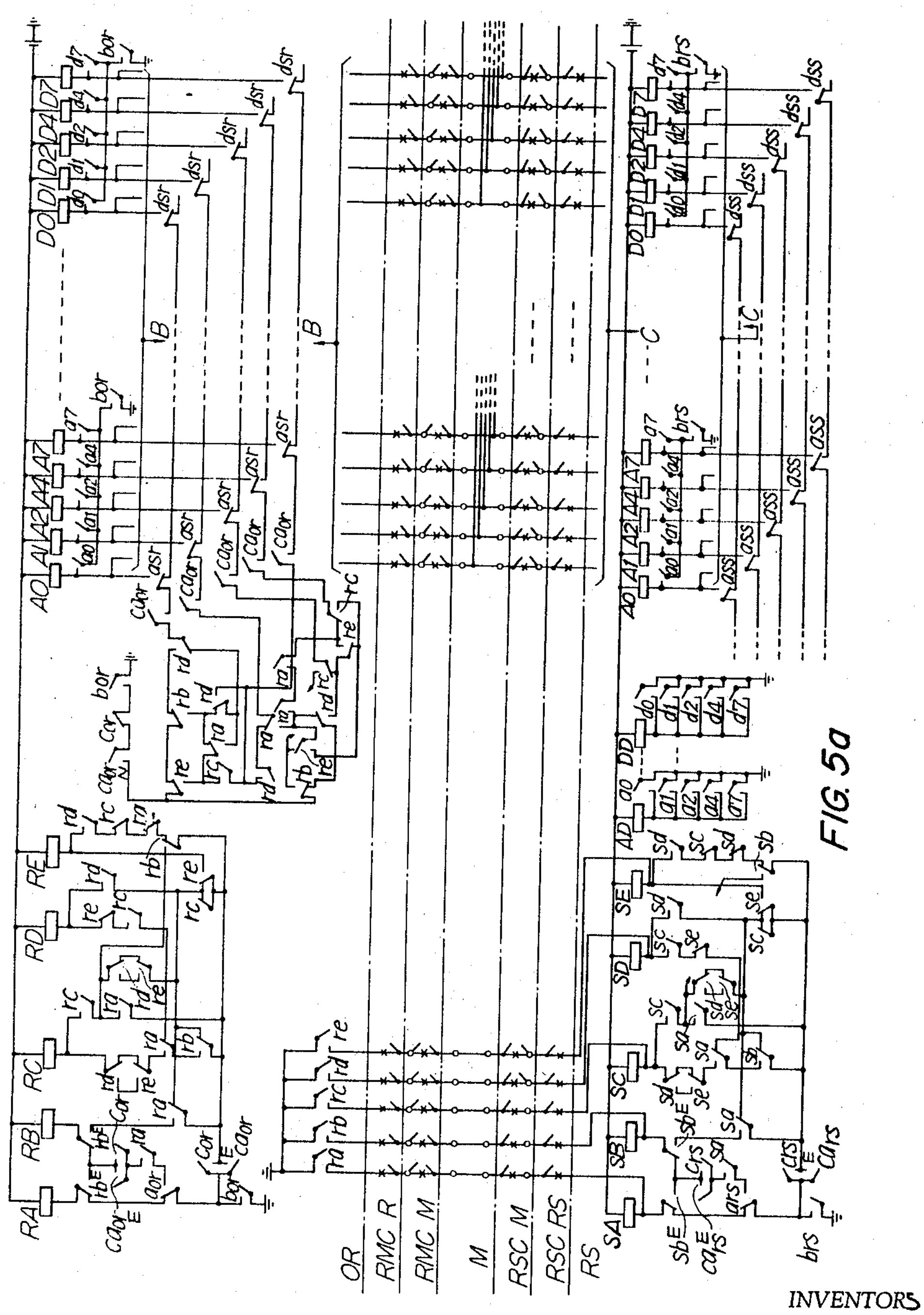
Figure 5B:
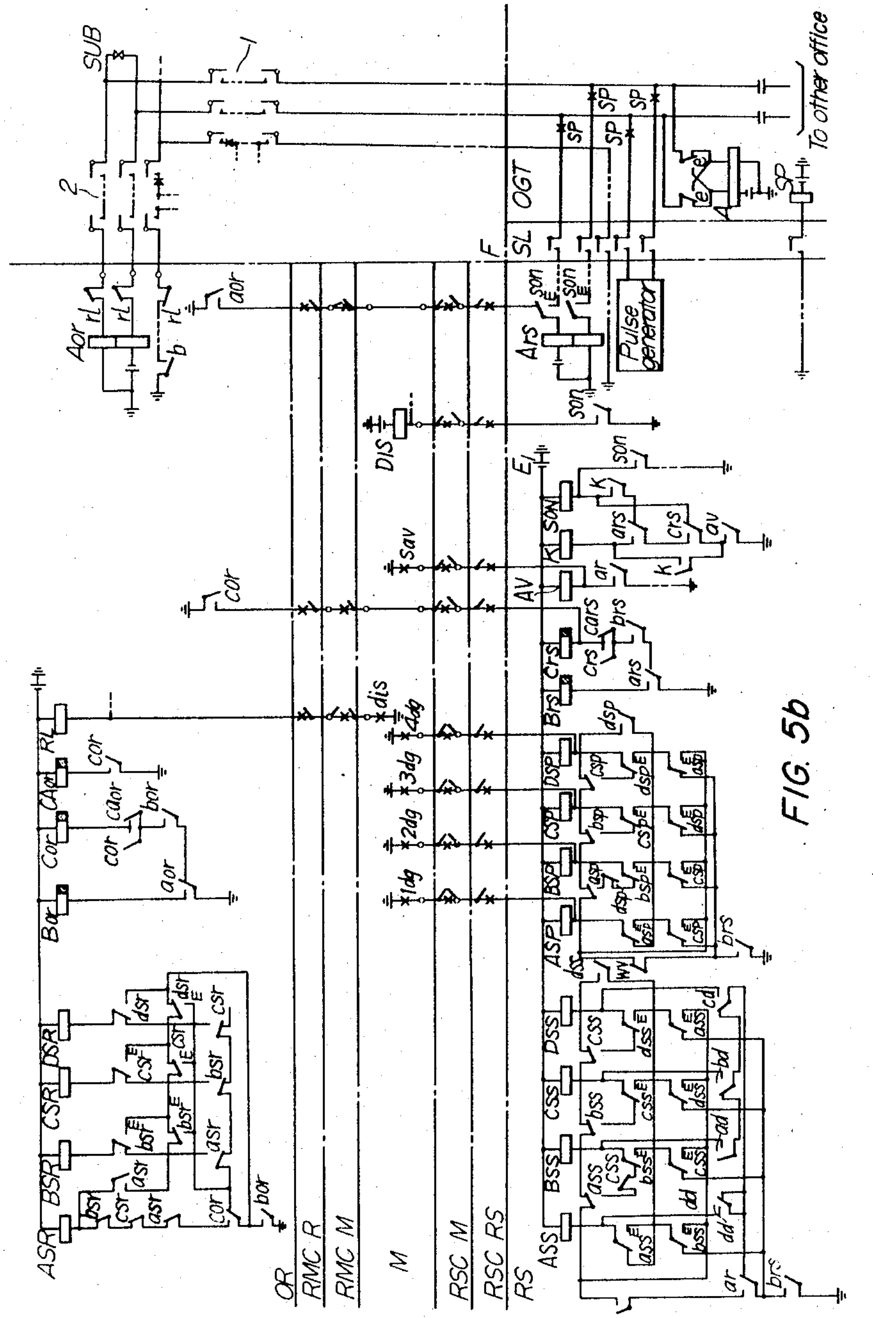

In FIG. 4, which diagrammatically illustrates the register and sender arrangement according to the present invention, it is assumed that the calling subscriber SUB is connected to the register OR through a talking channel 2. The register OR receives dial impulses transmitted from the calling subscriber SUB through the talking channel 2 and, after reception of the information necessary to locate the subsequent station, starts the marker M through the intermediary of register-marker connectors ORMC(R) and ORMC(M) to transfer the information received to the marker M seized.

The marker M, determining from the information the route to be established, selects a trunk block TB including an idle outgoing trunk OGT in the route and seizes the idle outgoing trunk OGT by way of a trunk block connector TBC. The frame connector FC is closed to form a talking channel 1 between the calling party and the outgoing trunk OGT. In the meantime, if a sender is required for the connection, an idle register-sender RS is selected by way of register-sender connectors RSC(M), RSC(RS) and the register-sender RS is connected to the previously seized outgoing trunk OGT through the sender link SL.

The succeeding operations are as follows, depending upon the state of the register OR at the instant when the above connecting operation has been completed.

Firstly, if, at the end of the connecting operation, the register OR is not receiving a selecting signal from a calling subscriber SUB, the register-sender RS issues a restoring indication to the marker M, which in turn issues a restoring indication to register OR. In this manner, the talking channel 2, register OR and marker M are restored. The reproduction and forwarding of the selecting signal transferred to the marker M is thus effected through the sender link SL while on the other hand the following selecting signal from the calling subscriber SUB is received by the register-sender RS through the talking channel 1, outgoing trunk OGT and sender link SL.

Secondly, if the register OR is receiving a selecting signal in the form of dial impulses from a calling subscriber when the marker M has completed all the connections, the talking channel 2, register OR and marker M are restored by the register-sender RS during the break period between the impulses and, if immediately after the train of impulses have been counted up, upon confirmation of the end of such impulse train, the following selecting signal or impulses from the calling subscriber being received by the register-sender.

To summarize the principles of the trunking procedure of the present invention described above, whenever a sender is required for the desired circuit connection, the circuit for receiving selecting signals is changed from the register OR side to the register-sender RS side at an appropriate instant described hereinafter.

Heretofore, it has been thought technically infeasible to change the signal-receiving circuit while it is receiving a selecting signal and common practice has been to start the marker M after the register OR has received all the digits of the called number. As pointed out hereinbefore, this means a delay in sending ringing tones, which corresponds to the time required for the sender to send out the selecting signal, and deteriorates the exchange service to that extent. According to the present invention, however, a satisfactory exchange service to calling subscribers is obtainable since the marker M can be started even during reception of the selecting signal by changing the receiving circuit, as distinct from the conventional trunking systems, in which the marker can only be started after the register OR has received all the digits of a selecting signal.

With such changing of the signal-receiving circuit, it is to be understood that even where relays of the type now used most widely are employed for reception of selecting signals there is no danger of excessively limiting their range of operation despite of some deterioration of the operating conditions of the relays due to the fact that the receiving circuit includes a parallel connection of the register OR and register-sender RS with respect to the calling subscriber. Also with this arrangement, there is no miscounting of the selecting signal when the receiving circuit is changed and the holding time of the marker M amounts at most to 100 milliseconds assuming a pulse rate of the selecting signal of 10 pulses per second. The holding time may be extended, if the marker is operated immediately following the reception of a selecting signal, by 200 milliseconds or thereabout for confirmation of the break period between signal digits upon the basis of the restoration of the C-position relay. Generally, the connection employing a sender is completed substantially within a minimum pause, enabling the circuit to be changed during the break period between signal digits. This reduces the chances of the holding time of the marker being extended as described above and hence makes the actual influence of such extension upon other calls negligibly small.

In addition, the arrangement of connectors according to the present invention is similar to that shown in FIG. 3 and makes the entire system very economical compared to the system of FIG. 2. According further to the present invention, though the sender is required to have an additional function to receive selecting signals so that it may also serve as a register-sender, the cost increase due to this requirement is tolerably small considering the reduced number of connectors and the improved exchange service to calling subscribers.

A specific circuit arrangement of the trunking system according to the present invention is illustrated in FIGS. *5a* and *5b*. Referring to these figures, the register OR is provided with a relay A*or* for reception of impulses, a B-position relay B*or* operable during operation of the register OR, a C-position relay C*or* which is held operative during each train of dial impulses representing one numeral or character, and a relay RL for restoration of the register OR. Relays RA–RE are counting relays constituting a counting circuit of the register; relays ASR–DSR are steering relays constituting a steering circuit; and relays A0, A1, A2, A4, A7 . . . D0, D1, D2, D4, D7 are numeral-storing relays forming a storing circuit of the 2-out-of-*5* code. In the register-sender RS are provided a relay A*rs* for impulse reception, a B-position relay B*rs*, a C-position relay C*rs*, counting relays SA–SE, steering relays ASS–DSS for signal reception, steering relays ASP–DSP for signal transmission, storing relays A1, A2, A4, A7 . . . D0, D1, D2, D4, D7, a relay AV for detecting completion of all the connections in marker M, and relays K and SON for changing the impulse-receiving circuit to the register-sender RS side while at the same time restoring the marker M and register OR. The marker M includes a relay DIS for its restoration, relay contacts 1*dg*–4*dg* for indicating how many first digits of the code number are deleted in sending impulses, and a relay contact S*av* for indicating that all the connections in the marker M have been completed. In the above arrangement, the counting, storing and steering circuits are well known per se and no specific description will be made herein on their operation.

It is assumed that the register OR is capable of storing up to four numerals and the register-sender RS is of the cyclic type well known in the art. In FIG. *5b*, numerals 1 and 2 in the frame F correspond to the talking channels 1 and 2 in the frame F in FIG. 4, and the mark X denotes make contacts.

The trunking operation of the system shown in FIGS. *5a* and *5b* will next be described.

After the register OR has received a selecting signal required to locate the subsequent station, the marker M is started through the intermediary of register-marker connectors RMC(R) and RMC(M) and the information stored in relays A0, A1, A2, A4, A7, etc. is transferred to the marker M by way of the path Ⓑ in FIG. *5a*. According to the information, the marker M forms the channel 1 while at the same time closing the sender link SL and register-sender connectors RSC(M) and RSC(RS). In this manner, the informations in the storing and counting circuits of the register OR and the states of relays A*or* and C*or* are transferred to the register-sender RS through the register-marker connectors RMC(R) and RMC(M), marker M, and register-sender connectors RSC(M), RSC(RS) thereby to completely synchronize the parallel receiving circuits including the register OR and register-sender RS, respectively. At the same time, the information indicating how many first digits should be deleted in sending signal impulses is given from the marker M by its relay contacts 1*dg*–4*dg*, shown in FIG. *5b*, to control the transmitting steering circuit. On the other hand, the digit number of the following impulses is determined through relays AD–DD of the register-sender RS thereby to control the receiving steering circuit.

When all the connections have been completed, the relay AV is operated by its grounding through contact S*av* of the marker M and the completion of the connecting operation is detected by the register-sender RS. If, when the relay AV is operated, the relay C*rs* of the register-sender RS, which is operable with operation of the relay

*Cor* of the register OR, is in restored position, it is ascertained that the register OR is not counting impulses and the relay SON is immediately operated through the the circuit including the ground, make contact *av*, break contact *crs*, relay SON and battery E1 to send to the marker M an indication for restoration. Simultaneously with this, relay *Ars* in the register-sender RS is prepared for receiving the following impulses.

On the other hand, if, when the relay AV is operated, the relay *Crs* is in operation, it is found that the register OR is counting the impulses or has just counted them up. In the former case, the state of relay *Aor* in the register OR is detected by the relay *Ars* by way of make contact *aor*. If the relay *Aor* is found to be in its restored state, it is operated by the next make pulse arriving from the calling subscriber and, when relay *Ars* is operated correspondingly, relay K is operated through the circuit including the ground, make contacts *av*, *crs* and *ars*, relay K and battery E1. During the next break period, when relay *Aor* and subsequently relay *Ars* are restored, a circuit including the ground, make contacts *av* and *crs*, break contact *ars*, make contact *k*, relay SON and battery E1 is established to operate relay SON to change the receiving circuit to the register-sender RS side. In case the relay *Aor* is in its operated position, relay K is immediately operated and during the next break period when relays *Aor* and *Ars* are restored, relay SON is operated to change the receiving circuit to the register-sender RS side.

On the other hand, if the relay AV is operated at the instant when a train of impulses has been counted up in the register OR, the relay SON is operated upon restoration of the relay *Crs* to change the receiving circuit over to the register-sender RS side.

In this manner, it will be appreciated that the receiving circuit can be changed smoothly from the register OR side over to the register-sender RS side at any instant irrespective of whether a selecting signal is being received or not and that the extension of the holding time of the marker M accompanying such circuit change has no substantial effect upon other calls.

Though in the foregoing description selecting signals have been assumed to be formed of impulses, the principles of the present invention can also be applied successfully to the so-called multifrequency code system, in which it has been difficult to change the receiving circuit during reception of a selecting signal, in this case taking the form of a multifrequency (MF) code signal, if only an arrangement is made to change the receiving circuit during a break period between digits of the code signal.

Further, the checking of the time to change the receiving circuit according to the present invention can be effected not only in the register-sender RS, as described herein, but also in the marker M or register OR with the same successful results.

As will be appreciated from the foregoing, the trunking system of the present invention far excels any of conventional systems in both serviceability and economics and is applicable not only between the register and sender of an automatic exchange but also between any two units operable to exchange information of the kind described. It will be apparent that the circuit arrangement of the inventive system is not limited to the relay type described herein.

We claim:

1. In an automatic exchange including a plurality of incoming lines connected to a switching frame, a plurality of outgoing trunks, a register including first means for receiving and storing selecting signals from any one of said incoming lines, and marker means for connecting said register through said switching frame by way of a selected first channel to one of said incoming lines requesting service, the improvement comprising a register sender including means for receiving and storing selecting signals, said register including second means for detecting from said selecting signals a request for an outgoing trunk, said marker means including connector means responsive to said second means for establishing a second channel from said one incoming line through said switching frame and an outgoing trunk to said register sender thereby effecting application of further selecting signals from said one incoming line to said register sender and restoring means responsive to said register sender for restoring said register and said first channel subsequent to establishment of said second channel.

2. The combination defined in claim 1 wherein said register includes third means responsive to said second means for transferring the selecting signals stored therein to said register sender.

3. The combination defined in claim 2 wherein said register sender includes inhibiting means responsive to said first means for inhibiting said restoring means while said register is in the process of receiving a selecting signal.

4. A common control automatic exchange comprising incoming lines including subscriber's lines connectable to a switching frame, outgoing trunks, a sender link, a register including means for receiving and storing selecting signals from any one of said incoming lines, a marker cooperable with said register, switching frame and sender link to complete a first channel between said incoming line and an outgoing trunk, a register sender including means for receiving and storing said selecting signals from said incoming line and regenerating and sending said selecting signals through one of said outgoing trunks and said sender link, said marker including means responsive to reception of a destination code from said selecting signals to complete connection between said outgoing trunk and said register sender forming a second channel, means for transferring the previously stored code of selecting signals in said register to said register sender through said marker, means for switching over the incoming line from the selecting signal receiving and storing means in said register to that in said register sender with aid of said marker, means for restoring said register and said first channel after said connection path and transfer of said information from said register to register sender are completed, and means preventing operation of said restoring means while said register is in the process of receiving a selecting signal.

References Cited

UNITED STATES PATENTS

| | | |
|---|---|---|
| 2,770,676 | 11/1956 | Gohorel. |
| 3,125,642 | 3/1964 | Anderson et al. |
| 3,278,691 | 10/1966 | Sherstiuk. |

KATHLEEN H. CLAFFY, *Primary Examiner.*

A. H. GESS, *Assistant Examiner.*